(12) United States Patent  
Bourdelles

(10) Patent No.: US 8,375,233 B2  
(45) Date of Patent: Feb. 12, 2013

(54) METHOD AND DEVICE FOR THE DYNAMIC MANAGEMENT OF CONSUMPTION IN A PROCESSOR

(75) Inventor: Michel Bourdelles, Herblay (FR)

(73) Assignee: Thales, Neuilly sur Seine (FR)

( * ) Notice: Subject to any disclaimer, the term of this patent is extended or adjusted under 35 U.S.C. 154(b) by 221 days.

(21) Appl. No.: 12/831,756

(22) Filed: Jul. 7, 2010

(65) Prior Publication Data

US 2011/0113271 A1    May 12, 2011

(30) Foreign Application Priority Data

Jul. 7, 2009 (FR) ...................................... 09 03346

(51) Int. Cl.
*G06F 1/32* (2006.01)

(52) U.S. Cl. .......................... 713/322; 713/320; 713/323

(58) Field of Classification Search .................... 713/320
See application file for complete search history.

(56) References Cited

U.S. PATENT DOCUMENTS

| | | | | |
|---|---|---|---|---|
| 5,857,154 A * | 1/1999 | Laborde et al. | ............... | 455/444 |
| 6,519,707 B2 * | 2/2003 | Clark et al. | ................... | 713/322 |
| 7,257,729 B2 * | 8/2007 | Lee et al. | ....................... | 713/600 |
| 7,788,670 B2 * | 8/2010 | Bodas et al. | .................. | 718/105 |
| 7,855,536 B2 * | 12/2010 | Sumita | .......................... | 323/275 |
| 8,156,363 B2 * | 4/2012 | Kobayashi et al. | ........... | 713/340 |
| 8,166,319 B2 * | 4/2012 | Svensson et al. | ............. | 713/320 |
| 8,166,328 B2 * | 4/2012 | Yang et al. | ..................... | 713/324 |
| 8,190,939 B2 * | 5/2012 | Fields et al. | ................... | 713/324 |
| 2002/0083355 A1 * | 6/2002 | Clark et al. | .................... | 713/322 |
| 2004/0193929 A1 * | 9/2004 | Kuranuki | ...................... | 713/322 |
| 2008/0016380 A1 | 1/2008 | Stufflebeam | | |
| 2008/0178023 A1 * | 7/2008 | Kim et al. | ..................... | 713/322 |
| 2009/0077394 A1 | 3/2009 | Tsai et al. | | |
| 2009/0172434 A1 | 7/2009 | Kwa et al. | | |
| 2010/0185882 A1 * | 7/2010 | Arnold et al. | ................. | 713/320 |

OTHER PUBLICATIONS

Search Report, mailed on Mar. 17, 2010, for FR 0903346, filed on Jul. 7, 2009.

* cited by examiner

*Primary Examiner* — Ryan Stiglic

(74) *Attorney, Agent, or Firm* — Stroock & Stroock & Lavan LLP

(57) ABSTRACT

A method for managing the power consumed in a processor executing an application, the application including several processing phases, each of which is associated with a computational load. The method includes defining a first nominal mode of consumption, defining at least one second mode of low consumption, and formulating a decision function making it possible optionally to switch from the nominal mode of consumption to the mode of low consumption during the transition from one processing phase to another processing phase of the application.

14 Claims, 4 Drawing Sheets

METHOD AND DEVICE FOR THE DYNAMIC MANAGEMENT OF CONSUMPTION IN A PROCESSOR

FIELD OF THE INVENTION

The present invention relates to a method and a device for the intelligent management of consumption in a processor which executes an application comprising various processing phases exhibiting variable computational loads.

BACKGROUND OF THE INVENTION

The dynamic management of the consumption of a processor, for example a generic processor of GPP ("General Purpose Processor") type, consists in adapting its voltage or its frequency so as to modulate the power provided by the processor as a function of the computational load required for the application that it is executing.

The processing operations implemented by a communication system may be grouped into two or more sets as a function of the computational load that they require. For example, a standby phase, the function of which is to detect a new communication, requires fewer operations per second than a data send or receive phase. Thus, a mode of consumption may be assigned to each of these phases as a function of the power delivered, low power mode for the standby phase, high power mode for the send or receive phases. The number of operations to be executed per unit time for each of these phases is predictable.

The transition from a low power mode to a high power mode is done with a significant latency which is in practice very penalizing when the intended application requires fast reaction times when passing from a processing phase with low computational power to a processing phase with high computational power. Moreover, the passage from one phase to another may result from the reception of exterior stimuli that are not predictable by the application itself. For example, the passage from a standby phase to a phase of receiving data is made when a technical word is received. This event is not predictable by the application or the processor itself. The latency induced by the changes of modes of consumption during the reception of these non-predictable stimuli prevents the execution of operations during this latency time and affects the associated processing. However, a maximum value of this latency is known.

The known solutions dealing with the problem of the use of DVFS techniques for managing the consumption of a processor are based more often than not on a prediction of the computation time inherent to a given phase of the executed application. These predictions are based on empirical models and do not take into account the occurrence of exterior stimuli as elements triggering a processing phase requiring a significant computational load. Neither do the prior art solutions deal with the drawback of the latency introduced during a transition between two modes of consumption.

The present invention proposes a solution making it possible to decide dynamically whether or not to pass from a mode of high consumption to a mode of low consumption (or vice versa) without impacting the nominal operation of the executed application, or impacting it with an evaluatable degradation.

SUMMARY OF THE INVENTION

The present invention is related to the framework of communications systems which at one and the same time implement standby or listening phases which require a low computational power and send/receive phases for a signal which conversely must benefit from all the power available on the processor to execute these processing operations.

The invention applies in respect of processors which have a capacity to dynamically scale the voltage and/or the frequency, such as the technique known by the abbreviation DVFS ("Dynamic Voltage/Frequency Scaling").

In an embodiment, the present invention is a method for managing the power consumed in a processor executing an application, the application executing several processing phases, each phase being associated with a computational load, the method being characterized in that the processor comprises means able to execute at least the following steps:
- defining a first nominal mode of consumption for which the power level consumed in the processor is compatible with the nominal operation of the application,
- defining at least one second mode of low consumption for which the power level consumed in the processor is less than that of the nominal mode of consumption,
- executing a decision function making it possible optionally to switch from the nominal mode of consumption to the mode of low consumption during the transition from one processing phase to another processing phase of the application, the decision being taken at least as a function of the computational load associated with the processing phases, of the maximum latency induced by the switch from one mode of consumption to another and of parameters of the application, so as to guarantee that the nominal operation of the application is maintained.

In an embodiment of the invention, the application is an application for wirelessly transmitting data with frequency jump between at least two appliances, the data being transmitted in the form of tiers, each tier being sent at a distinct frequency, the application comprising at least one standby phase for the link, a phase of establishing the link and a communication phase, the decision about switching from the nominal mode of consumption to the mode of low consumption being taken during the transition from the communication phase to the standby phase as a function of the signal-to-noise ratio of the link and/or of the temporal drift of the clock of the processor in the following manner:
- If the signal-to-noise ratio of the link is greater than a given threshold, the switch from the nominal mode of consumption to the mode of low consumption is performed,
- If the temporal drift of the clock of the processor is less than a given threshold S, the switch from the nominal mode of consumption to the mode of low consumption is performed.

In an embodiment of the invention, the standby phase for the link consists in standing by for the reception of a technical word on various frequencies, the duration of standby being parametrizable, the phase of establishing the link consists in sending/receiving a plurality of technical words, each technical word being sent/received on a different frequency, the decision about switching from the nominal mode of consumption to the mode of low consumption being taken additionally as a function of the following criterion:
- If the duration of time remaining between the reception of the first technical word and the start of the communication phase is greater than the maximum latency induced by the switch from one mode of consumption to another, then the switch from the nominal mode of consumption to the mode of low consumption is performed, otherwise it is not performed.

In another embodiment of the invention, the switch from one mode of consumption to another mode of consumption is carried out with the aid of a DVFS ("Dynamic Voltage and Frequency Scaling") scheme.

The invention also relates to a device comprising at least one processor executing an application comprising several processing phases, characterized in that it comprises means adapted for implementing the steps of the method for managing consumption such as previously described.

BRIEF DESCRIPTION OF THE DRAWINGS

Other characteristics will become apparent on reading the detailed description given by way of nonlimiting example which follows offered in relation to appended drawings which represent.

MORE DETAILED DESCRIPTION

Figure 1:
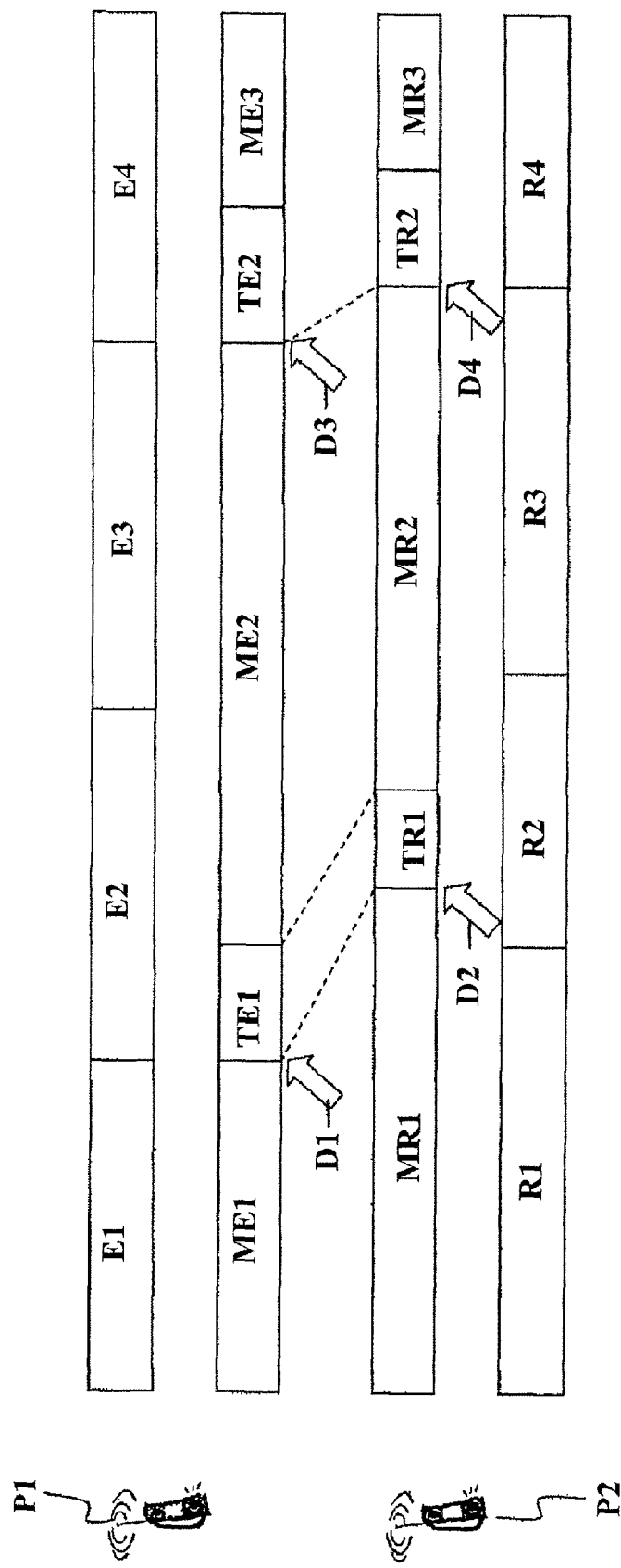
FIG. 1, an exemplary embodiment of the method according to the invention for a wireless communications application, FIGS. 2 and 3, two examples illustrating the implementation of the method according to the invention, FIG. 4, a schematic of the architecture of an electronic component implementing the method according to the invention.

FIG. 1 describes an exemplary communication system in accordance with an embodiment for which the invention applies. The various phases which occur during a wireless communication between two appliances are indicated. Each appliance comprises at least one processor which implements the method according to the invention. The modes of consumption corresponding to each processing phase are also indicated as well as the transitions from one mode to the other.

A first sender/receiver appliance P1 communicates with a second sender/receiver appliance P2 according to three distinct phases. The sender/receiver appliance P1 successively implements a standby phase for the link E1, a phase of establishing the link E2 or "Link Set Up", and a communication phase E3. At the end of the communication, the appliance P1 returns to a new standby phase E4. The appliance P2 implements a succession of similar phases, a first standby phase for the link R1, a phase of establishing the link R2 which occurs subsequent to the dispatching by the appliance P1 of technical messages during the phase of establishing the link E2 and a communication phase R3 which occurs subsequent to the dispatching of data messages by the appliance P1 during the communication phase E3. At the end of the communication phase R3, the appliance P2 returns to a standby phase for the link R4.

The various processing phases described utilize computational loads suited to the complexity of the processing operations implemented in order to be carried out correctly, that is to say in real time and without degradation of the data link between the two appliances. In particular, the standby phase for the link utilizes a lesser computational load than the phases of establishing the link and of communication which implement transmissions at a restricted throughput as well as complex processing operations to correctly establish the set of parameters which define the type of link supported, to transmit and receive with a maximum reliability the data exchanged between the two appliances.

The appliances P1 and P2 have the capacity to dynamically manage their consumption by using, for example, a technique known to the person skilled in the art by the abbreviation DVFS ("Dynamic Voltage & Frequency Scaling"). This technique makes it possible to define several modes of consumption as a function of the level of power delivered by the component which executes the various communication phases previously mentioned. Two modes of consumption may be, for example, defined, a first mode of low consumption and a second mode of high consumption. The precise consumption levels of each mode may be determined by way of the frequency or voltage of the component by virtue of a technique of DVFS type. The mode of low consumption ME1, ME3, MR1, MR3 is associated with the standby phases for the link E1, E4, R1, R4 which utilize a low computational load. Conversely, the mode of high consumption ME2, MR2 is associated with the phases of establishing the link E2, R2 and with the communications phases E3, R3 which utilize a high computational load.

A challenge arises of the transition between the two modes of consumption which induces a latency. When the appliance P1 passes to its phase of establishing the link E2, it triggers the transition D1 from the mode of low consumption ME1 to the mode of high consumption ME2, but this transition is effective only after a latency TE1. The start of the phase of establishing the link E2 may then be affected and the optimal operation of this phase is no longer ensured for the duration corresponding to the phase TE1. In an identical manner, the appliance P2 triggers D2 the switch from the low consumption mode MR1 to the high consumption mode MR2 at the moment at which it receives the first technical messages transmitted by the appliance P1 during its phase of establishing the link E2. Here also, the start of the phase of establishing the link R2 of the receiver appliance P2 may be affected.

At the instant at which the communication E3 terminates, another decision D3 about switching, this time from the high consumption mode ME2 to the low consumption mode ME3, is made by the appliance P1 and in a similar manner a decision D4 is made by the appliance P2. It is at the moment at which a communication terminates and a new standby phase E4, R4 occurs that the decision D3, D4 to pass, or not, to low consumption should take into account the impact of the latency TE1, TR1 which will occur when the inverse passage is performed at the commencement of a new phase of establishing the link.

This decision is formulated by taking into account the impact of the latency TE1, TR1 on the quality of the link. This latency induces a decrease in the processing capacity of the appliances P1, P2 the effect of which is to prevent the execution of operations as well as the sending/receiving of information by these appliances. However, it is possible to estimate whether it is tolerable to lose a part of these words as regards various criteria relating to the quality of the link, to the parameters of the radio protocol implemented or else of the quality of the synchronization of an appliance with respect to the other surrounding appliances within a shared network.

The method according to an embodiment of the invention includes formulating a decision function making it possible optionally to trigger the switch from a high consumption mode to a low consumption mode during, for example, a transition between a communication phase and a standby phase for the link.

This decision taking may be performed as a function of various criteria whose common denominator is to ensure that the passage to low consumption mode will not impact the quality of the data link or will impact it in a quantifiable and tolerable manner. For this purpose, certain parameters are used such as the knowledge of the quality of the propagation channel, of the quality of the clock of the appliance which implements the method for managing consumption according to the invention, of the knowledge of the synchronization of an appliance in relation to the other appliances occurring within the same network or else of the parameters of the radio protocol or of the waveform used.

The quality of the propagation channel may be estimated by way of the signal-to-noise ratio S/N measured on the link. This ratio S/N is more often than not determined by a specialized processor for processing signals such as a Digital Signal Processor which thereafter communicates this ratio to another processor which implements the management of consumption. The phase of establishing the link LSU implements the dispatching of technical messages, the number of which is parametrizable as a function notably of the quality of the link. Certain messages are dispatched several times according to a redundancy management mechanism which makes it possible to ensure the correct reception of these technical messages which contain significant information such as the addresses of the sender and of the receiver, the type of service provided, the type of data transmitted, the type of waveform implemented for the modulation of the data and the quality of the clocks. It is therefore possible to determine whether the loss of a limited number of technical messages does not cause any significant degradation on the link. With this a priori knowledge of the capacity to lose technical messages after receiving at least one of these messages in a given configuration, it is possible to pass to low consumption in the standby phase and to switch to high consumption in the transmission phase without any risk of losing the link. For this purpose, a possible decision criterion is the following, if the estimated signal-to-noise ratio on the link S/N is greater than a given threshold then the quality of the link is good enough for it to be possible to pass from a high consumption mode to a low consumption mode between the phases of communication and standby for the link.

A second possible decision criterion is based on the quality of the clock. In the course of the communication between the two appliances P1 and P2, a drift may affect the clocks which serve as time bases for synchronizing sending and receiving.

Figure 2:
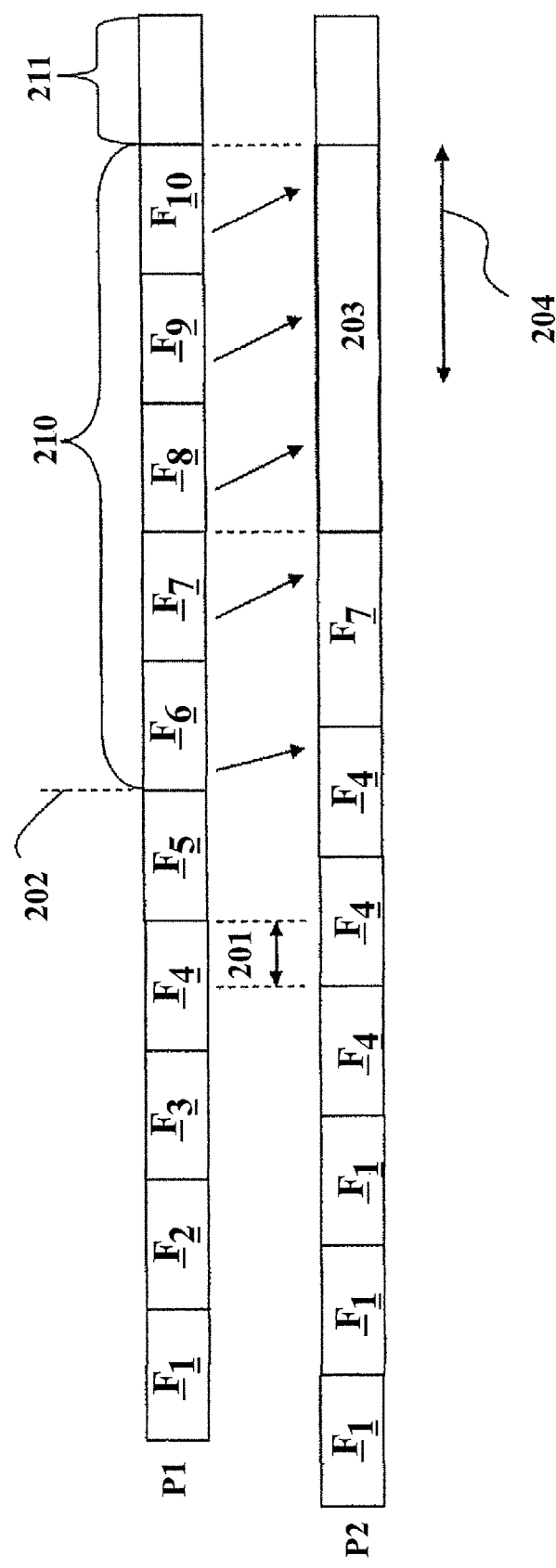

FIG. 2 describes an exemplary case of application of an embodiment of the invention. The appliances P1 and P2 communicate together with the aid of a frequency-jump transmission. The data are transmitted in the form of tiers at a given frequency $F_1, F_2, F_3, F_4, F_5, F_6, F_7, F_8, F_9, F_{10}$ which can vary from one tier to its successor. In the example illustrated in FIG. 2, the appliance P1 stands by for the reception of a technical word on a succession of distinct frequencies $F_1, F_2, F_3, F_4, F_5$ and then sends a series of technical words from the instant 202, each technical word also being transmitted on a different frequency $F_6, F_7, F_8, F_9, F_{10}$. In the example, the number of technical words sent is equal to 5, this number is a parameter of the phase of establishing the link 210, the sending of these technical words precedes the communication phase 211. The appliance P2 is desynchronized with respect to the appliance P1 by a time shift 201 due to the inaccuracy of the clocks. The value of this time shift 201 induces a standby law for the appliance P2 of three tiers per frequency, this signifying that the appliance P2 stands by for the receipt of a technical word three times successively on the same frequency $F_1, F_4, F_7$. When the technical word sent by the appliance P1 on the frequency $F_7$ is received by the appliance P2, the remaining duration 203 between the reception of this technical word and the start of the communication phase 211 is sufficient to allow a transition from a low consumption mode to a high consumption mode as regards the value of the maximum latency 204 caused by this transition. Sufficient is understood to mean that the duration 203 is greater than the maximum latency 204. The reception of a single technical word out of the five technical words sent is sufficient to establish the link correctly.

Figure 3:
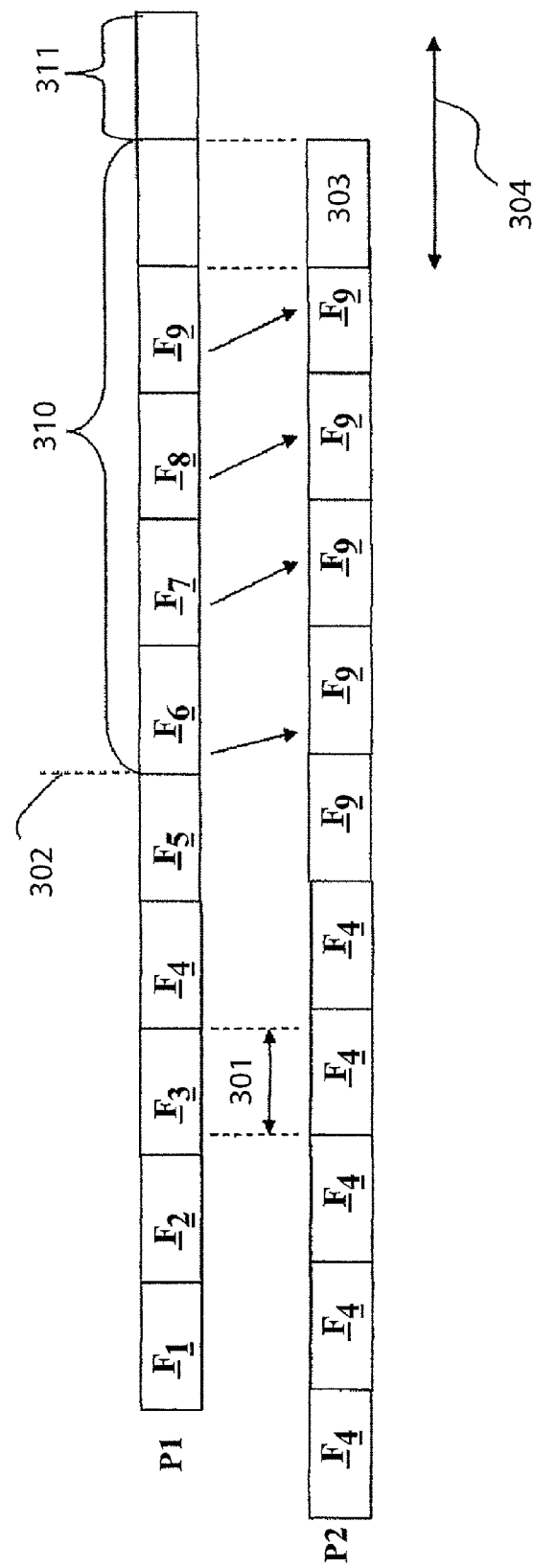

FIG. 3 illustrates a case of application of an embodiment of the invention for which the shift 301 between the receiver appliance P2 and the sender appliance P1 is significant, thus inducing a standby law for the appliance P2 of five tiers per frequency. This typical case gives rise to a reception of a later technical word, here when the appliance P2 stands by for the frequency $F_9$. In this case, the remaining duration 303 between the reception of a technical word and the start of the communication phase is not sufficient, since it is less than the maximum latency 304 caused by a transition from a low consumption mode to a high consumption mode so as to allow this transition.

The criterion for deciding the passage from high to low consumption is therefore formulated by taking into account on the one hand the uncertainty in desynchronization time 201,301 in relation to the other stations of the network and on the other hand the duration of standby on a reception frequency corresponding to this uncertainty, as regards the maximum latency 204,304 induced by a transition from one mode of consumption to another.

Figure 4:
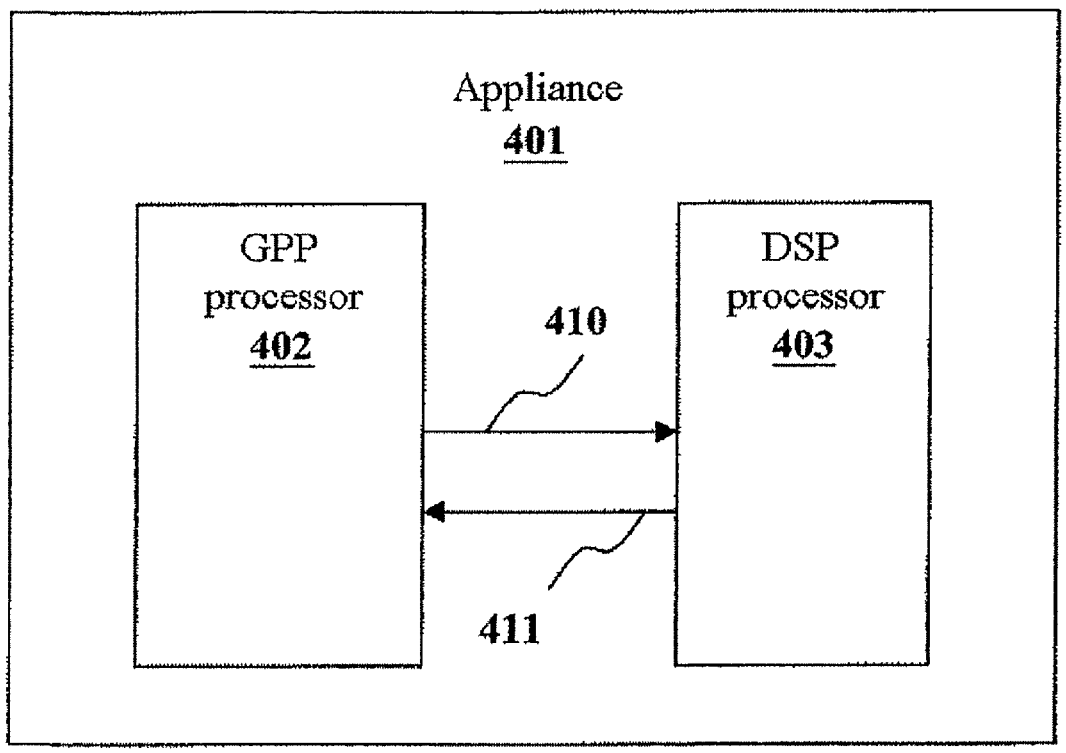

FIG. 4 schematically describes a sender/receiver appliance 401 comprising at least one generic processor 402, for example a processor of GPP type, and a signal processing processor 403, of DSP type. The method for managing consumption is implemented on the generic processor 402 which manages the application layers of the wireless transmission system executed by the appliance 401 and which communicates with the signal processing processor 403 which, for its part, manages the bottom layers of the transmission system. The signal processing processor 403 makes an estimate of the signal-to-noise ratio of the link and communicates it 411 to the generic processor 402 which uses this information to modulate its consumption by way of the method according to the invention. The generic processor 402 also informs 410 the signal processing processor 403 that a transition from one mode of consumption to another has been decided. This information makes it possible to adapt the processing operations performed at the level of the bottom layers as a function of the consumption level of the generic processor 402.

Without departing from the scope of the invention, the method for managing consumption may be implemented on a module for managing consumption which is separate from the processor or processors whose consumption it is sought to optimize and which communicates with them by way of computer-based means such as a software bus.

The method according to the invention is compatible with any type of applications for which the computational load implemented depends on exterior stimuli which trigger a given processing phase for which the necessary computational power is predictable.

Moreover the application may have the capacity to be informed of the fact that certain parts of the executed processing operations may be ignored from the nominal behaviour as a function of information about the environment of the application. The user's requirements should be complied with, however.

The invention presents notably the advantage of offering an improvement in consumption related to the use of schemes of DVFS type without loss of performance. Indeed, the impact of the significant latency occurring when passing from one mode of consumption to another is reduced since the decision to pass to low consumption is taken only if the resulting degradations on the data link are negligible.

While there have been shown and described particular features of the invention as applied to preferred embodiments thereof, it will be understood that various omissions, substitutions, and changes in the form and details of the devices illustrated, and in their operation, may be made by those skilled in the art without departing from the spirit and scope of the invention.

The invention claimed is:

1. A method for managing power consumed in a processor executing an application, the application comprising at least a first processing phase of unpredictable duration and a second processing phase, successive to the first processing phase and having a predictable beginning, the first phase being associated with a first computational load, the second phase being associated with a second computational load larger than the first computational load, the method comprising the following steps:
   defining a first nominal mode of consumption for which the power level consumed in the processor is compatible with the execution of the second phase,
   defining at least a secondary mode of low consumption for which the power level consumed in the processor is compatible with the execution of the first phase, and
   determining execution of the first phase with said secondary mode of low consumption only if a duration between an estimated termination of the first phase and a predictable beginning of the second phase is larger than a maximum latency induced by switching from the secondary mode of low consumption to the first nominal mode of consumption, so as to guarantee a correct execution of the second phase, otherwise executing the whole application with the first nominal mode of consumption.

2. The method of claim 1, wherein the application is an application for wirelessly transmitting data, on a wireless link with frequency hopping, between at least two appliances, the data being transmitted in the form of bursts, each burst being sent at a respective frequency, the first processing phase being for establishing the link, the second processing phase being a communication phase, the application further executing a third processing phase being a standby phase executed prior to a subsequent first processing phase for establishing a link and after the current communication phase, the decision on executing the first phase with the secondary mode of low consumption being taken during a transition from the communication phase to the standby phase as a decision about switching from the first nominal mode of consumption to the secondary mode of low consumption, the decision being taken only if
   a signal-to-noise ratio of the wireless link is greater than a predetermined noise threshold.

3. The method of claim 2 wherein the decision about switching from the first nominal mode of consumption to the secondary mode of low consumption is taken only if a temporal drift of a clock of the processor is less than a predetermined drift threshold.

4. The method of claim 3, wherein the switch from one mode of consumption to another mode of consumption is carried out with the aid of a DVFS ("Dynamic Voltage and Frequency Scaling") scheme.

5. The method of claim 2, wherein the switch from one mode of consumption to another mode of consumption is carried out with the aid of a DVFS ("Dynamic Voltage and Frequency Scaling") scheme.

6. The method of claim 1 wherein the application is an application for wirelessly transmitting data, on a wireless link, with frequency hopping, between at least two appliances, the data being transmitted in the form of bursts, each burst being sent at respective frequency, the first processing phase being for establishing the link, the second processing phase being a communication phase, the application further executing a third processing phase being a standby phase executed prior to a subsequent first phase for establishing a link and after the current communication phase, the standby phase being for standing by for reception of a technical word on a plurality of frequencies, the subsequent phase for establishing the link comprising sending or receiving a plurality of technical words, each technical word being sent or received on a different frequency, the decision on executing the subsequent phase for establishing the link with the secondary mode of low consumption being taken during a transition from the communication phase to the standby phase as a decision about switching from the first nominal mode of consumption to the secondary mode of low consumption, a termination of the subsequent phase for establishing the link being estimated as an instant of reception of the first technical word.

7. The method of claim 6, wherein the switch from one mode of consumption to another mode of consumption is carried out with the aid of a DVFS ("Dynamic Voltage and Frequency Scaling") scheme.

8. A device comprising at least one processor operable to execute an application comprising at least a first processing phase of unpredictable duration and a second processing phase, successive to the first processing phase, having a predictable beginning, the first phase being associated with a first computational load, the second phase being associated with a second computational load larger than the first computational load, the device further comprising means operable to:
   define a first nominal mode of consumption for which a power level consumed in the processor is compatible with the execution of the second phase,
   define at least one second mode of low consumption for which the power level consumed in the processor is compatible with the execution of the first phase, and
   determine execution of the first phase with the secondary mode of low consumption only if a duration between an estimated termination of the first phase and a predictable beginning of the second phase is lamer than a maximum latency induced by switching from the secondary mode of low consumption to the first nominal mode of consumption, so as to guarantee a correct execution of the second phase, otherwise executing the whole application with the first nominal mode of consumption.

9. The device of claim 8 wherein the application is an application for wirelessly transmitting data, on a wireless link with frequency hopping, between at least two appliances, the data being transmitted in the form of bursts, each burst being sent at a respective frequency, the first processing phase being for establishing the link, the second processing phase being a communication phase, the application further executing a third processing phase being a standby phase executed prior to a subsequent first phase for establishing a link and after the current communication phase, the decision on executing the first phase with the secondary mode of low consumption being taken during a transition from the communication phase to the standby phase as a decision about switching from the first nominal mode of consumption to the said secondary mode of low consumption, the decision being taken only
   if a signal-to-noise ratio of the wireless link is greater than a predetermined noise threshold.

10. The device of claim 9 wherein the decision about switching from the first nominal mode of consumption to the secondary mode of low consumption is taken only if a temporal drift of a clock of the processor is less than a predetermined drift threshold.

11. The device of claim 10 wherein the switch from one mode of consumption to another mode of consumption is carried out with the aid of a DVFS ("Dynamic Voltage and Frequency Scaling") scheme.

12. The device of claim 9 wherein the switch from one mode of consumption to another mode of consumption is carried out with the aid of a DVFS ("Dynamic Voltage and Frequency Scaling") scheme.

13. The device of claim 8 wherein the application is an application for wirelessly transmitting data, on a wireless link, with frequency hopping, between at least two appliances, the data being transmitted in the form of bursts, each burst being sent at respective frequency, the first processing phase being for establishing the link, the second processing phase being a communication phase, the application further executing a third processing phase being a standby phase executed prior to a subsequent first phase for establishing a link and after the current communication phase, the standby phase being for standing by for reception of a technical word on a plurality of frequencies, the subsequent phase for establishing the link including sending or receiving a plurality of technical words, each technical word being sent or received on a different frequency, the decision on executing the subsequent phase for establishing the link with the secondary mode of low consumption being taken during a transition from the communication phase to the standby phase as a decision about switching from the first nominal mode of consumption to the secondary mode of low consumption, a termination of the subsequent phase for establishing the link being estimated as an instant of reception of the first technical word.

14. The device of claim 13 wherein the switch from one mode of consumption to another mode of consumption is carried out with the aid of a DVFS ("Dynamic Voltage and Frequency Scaling") scheme.

* * * * *